Dec. 7, 1954  W. M. COX ET AL  2,696,021
SPOT VULCANIZER FOR REPAIRING ARTICLES
Filed Dec. 22, 1951  2 Sheets-Sheet 1

WILLIAM M. COX
& DAVID C. COX,
INVENTORS.

BY Eaton + Bell

ATTORNEYS.

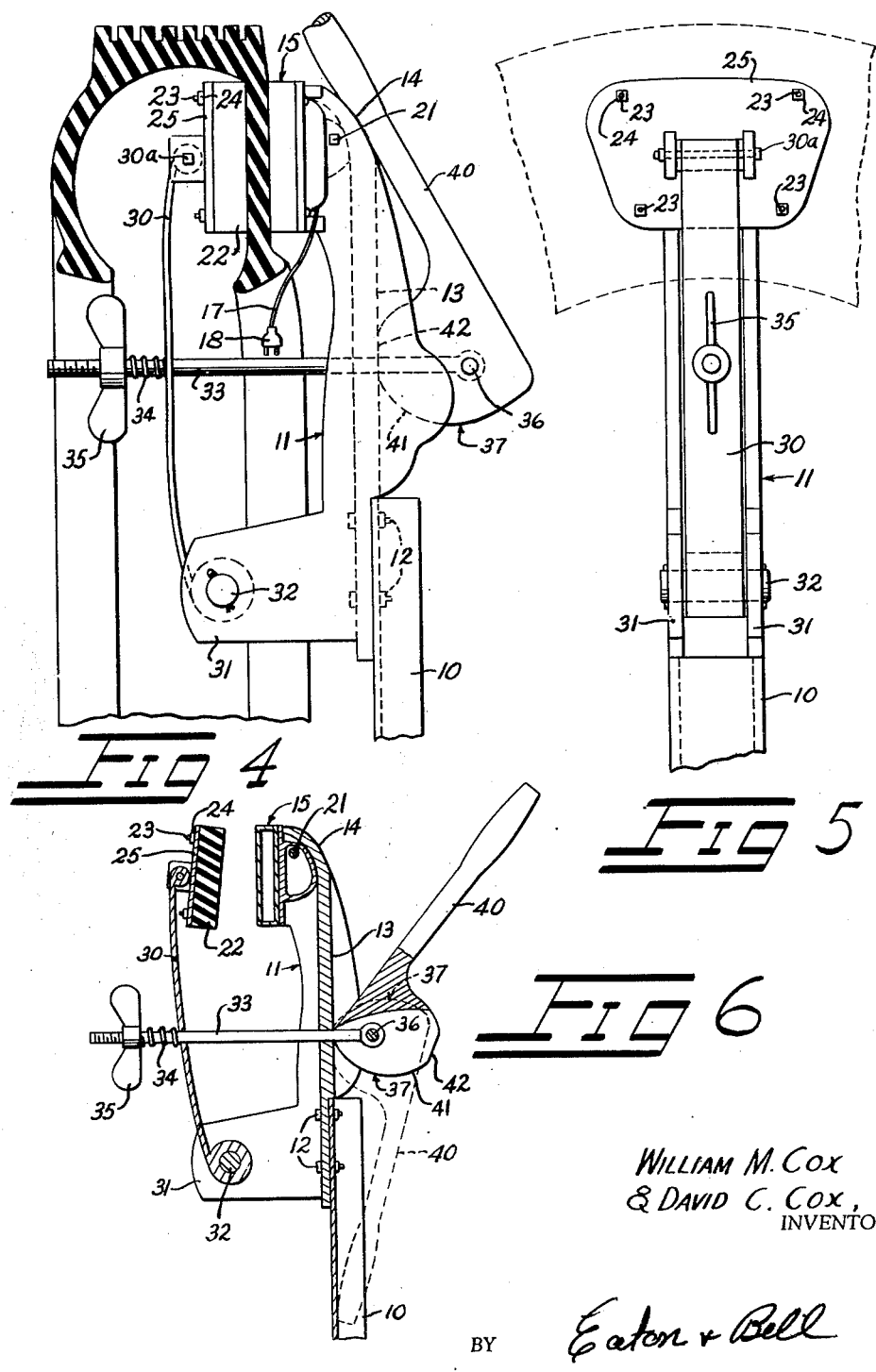

United States Patent Office 2,696,021

Patented Dec. 7, 1954

2,696,021

SPOT VULCANIZER FOR REPAIRING ARTICLES

William M. Cox and David C. Cox, Charlotte, N. C., assignors to William M. Cox, Charlotte, N. C., doing business as Cox Tire Machinery Co.

Application December 22, 1951, Serial No. 262,917

4 Claims. (Cl. 18—18)

This invention relates to improvements in apparatus for vulcanizing articles to be repaired and more especially to an improved spot vulcanizing device for repairing articles, made from rubber or analogous materials, such as pneumatic tires and the like.

One type of spot vulcanizer has a heating unit fixed on a rigid arm which cooperates with a movable pressure pad or pressure applying element of resilient construction and, assuming that a repair was to be made on the side wall of a tire, the side wall of the tire is positioned between the heating unit and pressure applying element, whereupon the pressure applying element is moved towards the heating unit to clamp the tire against the heating unit during the vulcanizing process.

Now, means have heretofore been used for locking the pressure applying element against one wall of the tire to thereby clamp the tire between the pressure applying element and the heating unit, and this means has not been satisfactory due to the extensive pressures required to be applied by the operator in the clamping operation.

It is therefore the primary object of this invention to provide an improved mounting for the resilient pressure applying element including a leaf spring member, to the upper end of which the pressure applying element is pivoted and the lower end of this leaf spring member being pivoted on the rigid arm to the upper end of which the heating element is secured.

A rod extends through the leaf spring member and through the medial portion of the rigid arm to which the heating unit is secured and is pivotally connected to a cam member having a handle portion extending outwardly therefrom and this cam is urged against the outer surface of said rigid arm by means of a compression spring surrounding said rod and there being an adjustment nut on the end of the rod to urge the compression spring against the outer surface of the leaf spring member. Thus, a minimum amount of exertion is required of the operator to move the cam through manipulation of the handle extending therefrom and whereupon the compression spring will cause the leaf spring member to move inwardly or towards the rigid member and, in so doing, will clamp the resilient pressure applying element against the corresponding surface of the side wall of the tire or other element to be repaired.

Some of the objects of the invention having been stated, other objects will appear as the description proceeds when taken in connection with the accompanying drawings, in which—

Figure 4 is an enlarged view similar to the upper portion of Figure 1, showing the tire clamped in one position and showing the cam associated with the locking means in one position relative to the rigid member on which the heating unit is mounted;

Figure 5 is an enlarged view looking at the left-hand side of Figure 1 but omitting the lower portion thereof and showing the manner in which the pressure applying element is mounted;

Figure 6 is a vertical sectional view taken substantially along the line 6—6 in Figure 2 but showing an alternate manner in which the cam may be positioned for the convenience of the particular operator in clamping an article between the proximate faces of the heating unit and the pressure applying element.

Figure 1:
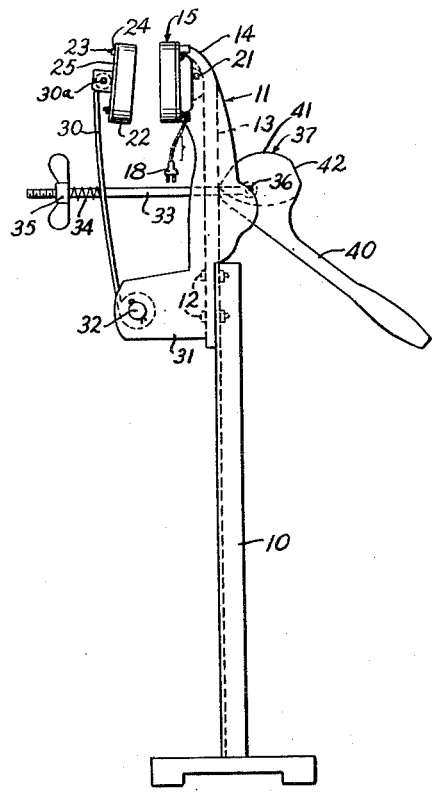
Figure 1 is a side elevation of a spot vulcanizer showing the improved clamp locking means in association therewith.
Figure 2:
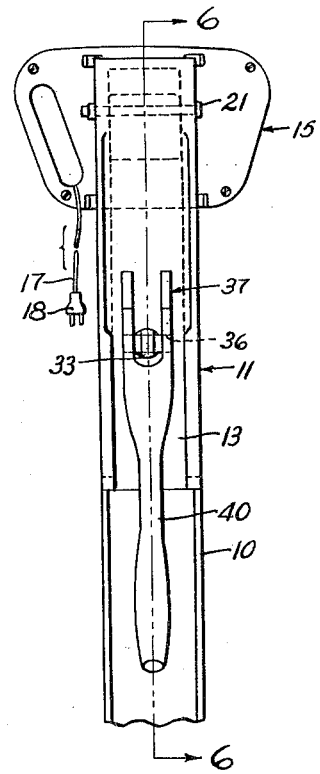
Figure 2 is an enlarged fragmentary elevation looking at the right-hand side of Figure 1 but omitting the lower portion thereof.
Figure 3:
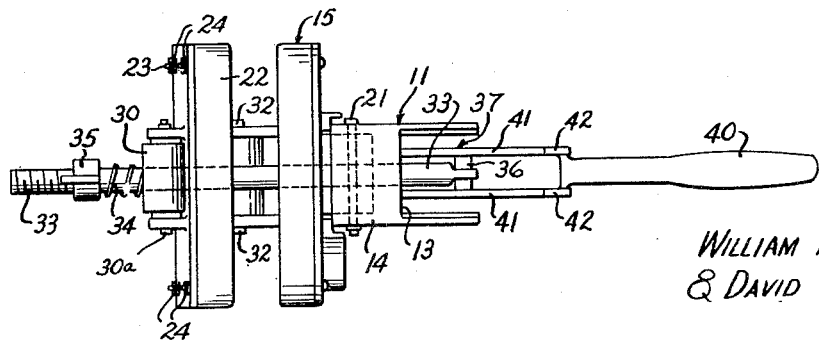
Figure 3 is an enlarged top plan view of the structure shown in Figure 1.

Referring more specifically to the drawings, there is shown a spot vulcanizing device of a type as disclosed in United States Patent No. 2,249,249 to Paul L. Meath, and modified to illustrate the present invention.

The spot vulcanizing machine comprises a pedestal 10, to the upper end of which an upright stationary rigid arm 11 which may be of cast construction is suitably secured, as by bolts 12. This rigid arm has a flat outer surface 13 and is curved inwardly at its upper end as at 14. A suitable heating unit 15 is secured to the upper end of the rigid arm 11 and this heating unit 15 may be of any desired construction and heated by any suitable means. In the present instance, the heating unit 15 is shown in the form of an electrical heater of any well known type and of such size and shape that it may fit within the casing of a tire, such as the tire shown in Figure 4. This heating unit 15 is supplied with current through a cord 17 having a plug 18 thereon adapted to be connected to a suitable source of electrical energy, not shown.

The heating unit 15 is suitably secured to the inner surface of the upper portion of the rigid arm 11 as by a bolt 21. The conventional spot vulcanizing machine also comprises a resilient pressure applying element 22 which is of a shape corresponding to the shape of the heating unit 15 and which is in the form of a solid resilient member, such as rubber and the like, having suitable studs 23 projecting therefrom which have nuts 24 thereon for securing the resilient number 22 to a plate or bracket 25.

The parts heretofore described are the usual parts of a spot vulcanizing machine, and particularly of the type shown in said Patent No. 2,249,249, and it is with these parts that the improved clamp actuating and locking means is adapted to be associated.

Novel means are provided for supporting the pressure applying element 22 and for urging the same towards the heating element 15 for clamping the article to be repaired, such as the tire shown in Figure 4, therebetween. This supporting and actuating clamp means comprises a leaf spring arm or member 30 which is pivotally connected at its upper end, as at 30a, to the plate 25 which supports the resilient pressure applying member or element 22.

The lower end of the leaf spring member 30 is disposed between closely spaced ears 31 which project from the lower portion of the rigid arm 11 and this leaf spring member is pivotally mounted on a pin 32 supported by said ears 31. It will be noted that the leaf spring member 30 is normally biased outwardly relative to the rigid member or arm 11.

Spanning the distance between the rigid arm 11 and the leaf spring member 30 and slidably penetrating the same is a rod or arm 33, the left-hand end of which, in Figures 1, 3, 4, and 6, extends beyond the leaf spring member 30 and is encircled by a compression spring 34 held against the outer surface of the leaf spring member 30 by a nut 35, preferably a wing nut, threadably mounted on the threaded outer end of the rod 33. The end of the rod 33 remote from the end on which the nut 35 is mounted extends substantially beyond the rigid arm 11 of the spot vulcanizing machine and is pivotally mounted, as at 36, in a bifurcated cam portion 37 fixed on one end of a handle 40 which is adapted to be manipulated by an operator for clamping and unclamping the tire from between the heating element 15 and the resilient pressure applying element 22.

Now, this handle 40 and the cam portion 37 thereon may be positioned in either the position shown in Figure 4 or that shown in dotted lines in Figure 6 during the clamping operation merely by loosening the nut 35 and moving the rod 33 along with the cam portion 37 outwardly beyond the flange portion of the rigid arm 11 and then rotating the handle 40 about the axis of the rod 33 to the desired position, after which the nut 35 may again be tightened as desired. It will be noted that the cam portion 37 on the handle 40 has a generated curved outer cam surface 41 and a relatively flat cam or locking surface 42.

Assuming the parts to be in the position shown in Figure 1, the article to be vulcanized, such as the tire shown in Figure 4, may be positioned with the desired portion thereof between the heating element 15 and the pressure applying element 22, whereupon it is merely necessary for the operator to move the handle 40 upwardly or in a counter-clockwise direction from the position shown in Figure 1 to that shown in Figure 4 and during which the curved surface 41 on the cam portion 37 will bear against the outer surface 13 of the rigid arm 11 and will thereby cause the rod 33 to move from left to right.

As the initial movement of this rod 33 is effected, the compression spring 34 will swing the leaf spring member 30 about the pivot point 32 until the pressure applying element 22 engages the corresponding surface of the article to be repaired. The compression spring 34 serves to absorb the initial shock of the pressure applying element 22 engaging or clamping against the article to be repaired and, after the compression spring 34 has been compressed somewhat in addition to its normal compression as determined by the wing nut 35, the leaf spring member 30 is then biased inwardly or towards the rigid arm 11.

At this point, the flat surface 42 of the cam portion 37 or the handle 40 has moved into engagement with the outer surface 13 of the rigid arm 11 to thus lock or latch the clamping or pressure applying member in clamping position against the heating unit 15.

In one instance, it will be noted that the handle 40 extends upwardly and inwardly at an angle relative to the rigid arm 11 of the vulcanizing machine (Figure 4) and, in the other instance, it will be observed in Figure 6 that the handle 40 extends downwardly adjacent the pedestal 10. The arrangement of the handle 40 and the corresponding cam portion 37 thereof in the position shown in Figure 6 facilitates the placing of the tire over either the heating element 15 or the pressure applying element 22. On the other hand, with the handle in the position shown in Figure 4, it is evident that the tire could only be placed over the pressure applying element 22. It may be desirable to position the parts as shown in Figure 4 in the event of the stature of the operator being such that it is easier to move the handle 40 upwardly during the clamping operation than it is to move it downwardly as shown in Figure 6 or vice versa.

It is thus seen that we have provided improved actuating means for clamping a tire casing or the like between the proximate or clamping faces of the heating element 15 and the pressure applying element 22 wherein a minimum of effort is required in performing this operation.

In the drawings and specification, there has been set forth a preferred embodiment of the invention and although specific terms are employed, they are used in a generic and descriptive sense only and not for purposes of limitation, the scope of the invention being defined in the claims.

We claim:

1. An improvement in a spot vulcanizing machine for repairing tire casings and the like having a rigid upright arm with a heating unit positioned substantially at the upper end thereof and also having a pressure applying element positioned opposite the outer surface of said heating unit, said improvement comprising improved means for supporting the pressure applying element and for actuating the same in a clamping operation including a leaf spring member to the upper end of which said pressure applying element is pivotally connected, means pivotally connecting the lower end of said leaf spring member to the rigid arm a substantial distance below the heating unit and the pressure applying element, a substantially horizontally extending rod slidably penetrating and extending between said leaf spring member and the rigid arm, a cam pivotally mounted on one end of said rod and having a handle extending substantially radially therefrom, a compression spring encircling said rod and engaging the outer surface of said leaf spring member relative to the rigid arm, means engaging the outer end of said compression spring and being fixed on said rod to thereby normally urge said rod outwardly with respect to said leaf spring member and to urge said leaf spring member inwardly with respect to said rigid arm, said compression spring also serving to urge said cam member on the opposite end of said rod into engagement with the outer surface of said rigid arm and said cam being so formed as to cause the rod to move toward the rigid arm relative to said leaf spring member upon moving said handle in one direction, whereby the compression spring on the rod will urge the pressure applying element into resilient clamping engagement with the heating unit whereby said tire casing may be clamped between the pressure applying element and heating unit for repairing the same.

2. An improvement in a spot vulcanizing machine having a rigid upright arm with a heating unit positioned substantially at the upper end thereof and also having a pressure applying element positioned opposite the outer surface of said heating unit, said improvement comprising improved means for supporting the pressure applying element and for actuating the same in a clamping operation including a leaf spring member biased slightly outwardly relative to the rigid arm and to the upper end of which said pressure applying element is pivotally connected, means pivotally connecting the lower end of said leaf spring member to the rigid arm a substantial distance below the heating unit and the pressure applying element, a substantially horizontally extending rod slidably penetrating and extending between said leaf spring member and the rigid arm, a cam pivotally mounted on one end of said rod and having a handle extending substantially radially therefrom, said cam having a generated curved surface and a flat locking surface thereon, a compression spring encircling said rod and engaging the outer surface of said leaf spring member relative to the rigid arm, means engaging the outer end of said compression spring and being fixed on said rod to thereby normally urge said rod outwardly with respect to said rigid arm, said compression spring also serving to urge said cam on the opposite end of said rod into engagement with the outer surface of said rigid arm and said generated curved surface on the cam being so formed as to cause the rod to move toward the rigid arm relative to said leaf spring member upon moving said handle in one direction, whereby the compression spring on the rod will urge the pressure applying element into clamping engagement with the heating unit, and said flat locking surface being so positioned relative to the generated curved surface as to engage the outer surface of the rigid arm upon said pressure applying element being moved against the heating unit for locking the cam in position whereby said tire casing may be clamped between the pressure applying element and heating unit for repairing the same.

3. An improvement in a spot vulcanizing machine for repairing articles, such as pneumatic tires and the like, said machine having a rigid upright member and a heating unit positioned substantially at the upper end of the upright member and also having a pressure applying element positioned opposite the outer surface of said heating unit, said improvement comprising improved means for supporting the pressure applying element and for actuating the same in a clamping operation including an elongated leaf spring member, means connecting the pressure applying element to the upper end of said elongated leaf spring member, means pivotally connecting the lower end of said elongated leaf spring member to the rigid upright member a substantial distance below the heating unit and the pressure applying element, a substantially horizontally extending rod slidably penetrating the elongated leaf spring member and the rigid upright member and extending therebetween, a cam pivotally mounted on one end of said rod and having a handle extending substantially radially therefrom, a compression spring encircling said rod at a point remote from said cam and engaging the outer surface of one of said members relative to the other of said members, means fixed on the outer end of the rod and engaging the outer end of said compression spring relative to the corresponding member to thereby urge the cam into engagement with the other of said members, and said cam being so formed as to cause the rod to move in a direction away from the end of said rod on which the spring is mounted upon moving said handle in one direction, whereby the compression spring on the rod will urge the member with which it is in engagement toward the other of the members to cause the pressure applying element to be moved into clamping engagement with the heating unit and whereby said pneumatic tire may be clamped between the pressure applying element and the heating unit for repairing the same.

4. An improvement in a spot vulcanizing machine for repairing articles, such as pneumatic tires and the like, said machine having a heating element and a pressure applying element between which the article to be repaired is adapted to be positioned and a rigid member supporting said heating element, said improvement comprising means for resiliently supporting the pressure applying element comprising a leaf spring, means pivotally connecting one end of said leaf spring to the rigid member at a point spaced below the heating element, said leaf spring having the pressure applying element mounted on the other end thereof, a rod slidably penetrating said leaf spring and said rigid member, means on one end of said rod adapted to engage the outer surface of the leaf spring, a handle pivotally connected to the other end of said rod on the outer side of said rigid member and cam means on said handle engagable with the outer surface of said rigid member for locking the leaf spring in inwardly biased position relative to the rigid member.

References Cited in the file of this patent

UNITED STATES PATENTS

| Number | Name | Date |
|---|---|---|
| 1,754,575 | Scharpf | Apr. 15, 1930 |
| 2,249,249 | Meath | July 15, 1941 |
| 2,581,608 | Slatkin | Jan. 8, 1952 |